April 15, 1941. E. FISCHEL ET AL Re. 21,770

CONTROL APPARATUS FOR VEHICLES

Original Filed May 21, 1938 3 Sheets-Sheet 1

INVENTORS
Eduard Fischel
Johannes Thury
Stephen Lestvick

BY

ATTORNEY.

April 15, 1941. E. FISCHEL ET AL Re. 21,770

CONTROL APPARATUS FOR VEHICLES

Original Filed May 21, 1938 3 Sheets-Sheet 2

INVENTORS
Eduard Fischel
Johannes Thiry
Stephen Austrik
ATTORNEY.

BY

Exami

April 15, 1941.

E. FISCHEL ET AL

Re. 21,770

CONTROL APPARATUS FOR VEHICLES

Original Filed May 21, 1938

3 Sheets-Sheet 3

INVENTORS

Eduard Fischel

Johannes Thiry

Stephen Czestrik

BY

ATTORNEY.

Reissued Apr. 15, 1941 Re. 21,770

UNITED STATES PATENT OFFICE 21,770

CONTROL APPARATUS FOR VEHICLES

Eduard Fischel, Freilassing, Oberbayern, and Johannes Thiry, Berlin-Charlottenburg, Germany, assignors to Siemens Apparate und Maschinen Gesellschaft mit beschränkter Haftung, Berlin, Germany, a corporation of Germany Original No. 2,188,834, dated January 30, 1940, Serial No. 209,344, May 21, 1938. Application for reissue December 10, 1940, Serial No. 369,460. In Germany April 29, 1937

23 Claims. (Cl. 244—76)

This invention relates to control apparatus for vehicles and more particularly to automatic pilot means for aircraft or marine vessels.

One of the objects of the present invention is to provide novel control means for aircraft marine vessels and the like wherein suitable control surfaces are angularly displaced, in compensation for course or attitude deviations, by an amount which is a function of the turning movement necessary to return the vehicle to the original course or attitude.

A further object is to provide novel automatic pilot means for aircraft wherein equal deviations from a predetermined attitude are corrected during substantially equal periods of time for all speeds.

Another object is to provide novel means of the above character, wherein the compensating control surface displacement for course deviations takes place at a speed which is a function of the speed of the craft, and also of the amount of said displacement.

A further object is to provide novel control means for aircraft, marine vessels, and the like, which will quickly correct for deviations of the vehicle from a predetermined course.

An additional object is to provide novel automatic pilot means, for vehicles such as aircraft, which means are responsive to the forces acting on the control surface which forces are, in turn, dependent upon the air speed of the craft.

Another object is to provide novel automatic pilot means for aircraft wherein the compensating control surface displacement is a function of the air speed and the altitude.

A further object is to provide novel vehicle control means wherein an air speed gauge aids in controlling the amount and speed of the angular displacement of control surfaces in compensating for a deviation from a predetermined attitude.

The above and further objects and novel features of the invention will more fully appear from the following detailed description when the same is read in connection with the accompanying drawings. It is to be expressly understood, however, that the drawings are for the purpose of illustration only and are not intended to define the limits of the invention, reference being had primarily for this latter purpose to the appended claims.

In the drawings, wherein like reference characters refer to like parts throughout the several views.

The form of the invention illustrated, by way of example, is an automatic course control device for aircraft and is constituted by a direction indicator which is adapted for transmitting deviations from a predetermined course to a servomotor which governs a rudder or control surface. In cooperation with said direction indicator, the servomotor is controlled by additional means, which are responsive to the air speed, in such a manner that the rudder is displaced by an amount which will produce the proper turning moment necessary to restore the craft to the predetermined course. In order that course deviations may be corrected smoothly and uniformly, speed control means are provided for said servomotor whereby the control surface is angularly displaced at such a velocity that the time interval required to correct a given course error will be approximately equal for all air speeds. This is accomplished by controlling said speed in response to either the dynamic air pressure or to the angular displacement of the control surface.

Figure 1:
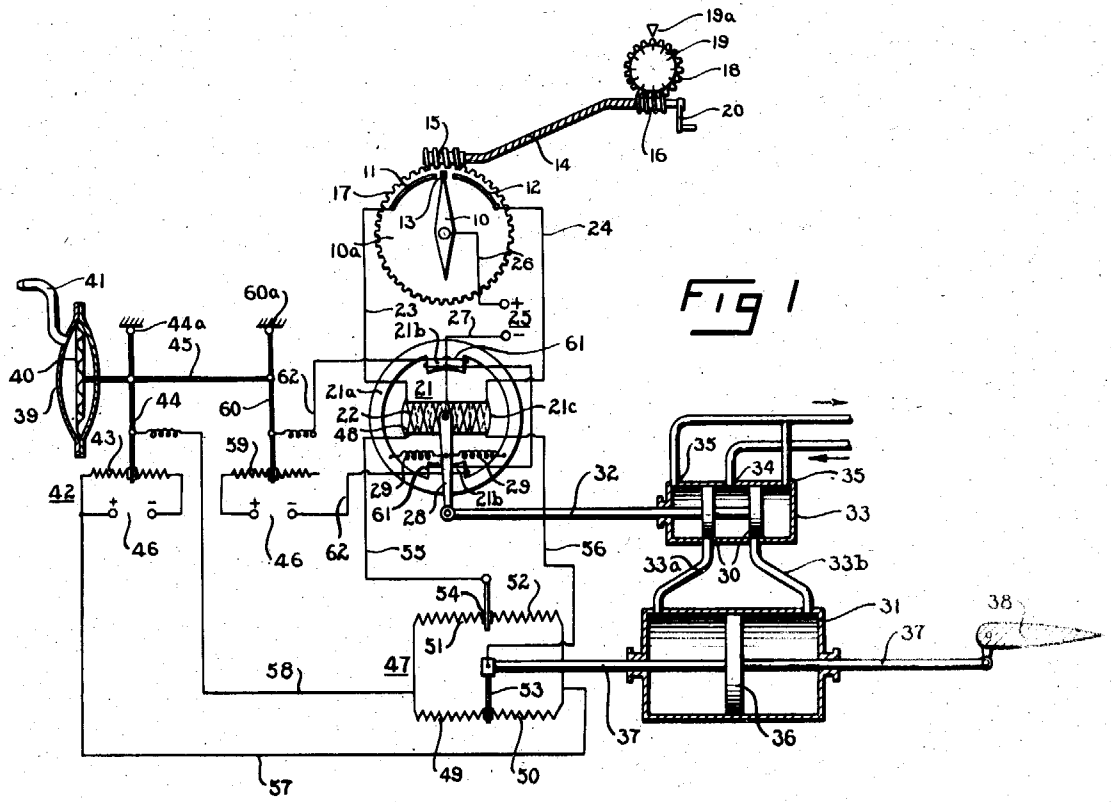
Fig. 1 is a schematic diagram of one embodiment of the invention.

One embodiment of the present invention is illustrated in Fig. 1 wherein novel means are provided for controlling the amount and the angular velocity of deflection of the rudder of an aircraft. The amount of deflection is governed in response to the dynamic air pressure which, in turn, is a direct function of the air speed and an inverse function of the altitude. The angular velocity of deflection is also governed by said dynamic air pressure whereby said velocity is high for low pressures and low for high pressures. It is desirable that the deflection be an inverse function of the altitude because at a high altitude the air density is low; consequently, a greater deflection is necessary to produce a given turning moment than when at a low altitude. The novel means are constituted by a magnetic compass having a needle 10 mounted in a conventional manner above a disc 10*a*. The compass is adapted for serving as a direction transmitter, the disc 10*a* being provided with contacts 11 and 12 which engage a contact 13 in accordance with a right and left course deviation, respectively. The contact 13 is attached to one extremity of needle 10. The direction transmitter may be adjusted to a desired course, for example, by means of a flexible shaft 14 to which are attached worms 15, 16 meshing, respectively, with a worm wheel 17 connected to disc 10a and with a worm wheel 18 of a compass disc 19 having an index mark 19a. The shaft 14 may be rotated by a suitable hand knob 20.

Operatively connected to the above-described direction transmitter is an amplifying arrangement constituted by a rotary magnet 21 which is adapted for governing a servomotor to be later explained. Rotary magnet 21 comprises a stator 21a having opposed poles 21b, 21b for a purpose to be later set forth and an armature 21c having a coil 22 thereon. The opposite extremities of said coil are connected to contacts 11 and 12 by leads 23 and 24, respectively. The circuit is energized by a suitable source of electric energy 25 which is connected by leads 26, 27 to needle 10 and to the center of coil 22, respectively. An arm 28 attached to said armature is normally held in a centralized position by opposed springs 29, 29, and the compass deviations, as reflected by armature movements, are transmitted by said arm to a conventional control valve 30 of a hydraulic servomotor 31, for example, by means of a rod 32 which is pivotally connected to arm 28. Valve 30 moves within a cylinder 33 having pressure agent inlet 34, exhaust ports 35, 35, and conduits 33a, 33b to motor 31. A piston 36 having a piston rod 37, of said servomotor, is operatively connected to a control surface 38, for example, a vertical rudder of an aircraft.

Means are provided for returning valve 30 to the closed position in response to an electric current which is governed by the dynamic air pressure and also by the amount of the angular displacement of the rudder, the dynamic air pressure being a function of the air speed. The current governing means comprise a pressure gauge 39 having a diaphragm 40 and a suitable tube portion 41, the open end of which is exposed to the air stream external to the aircraft such that the air pressure acts upon one side of said diaphragm. A spring (not shown), which is adjustable in tension, acts upon the opposite side of the diaphragm.

In order that diaphragm 40 may control the potential of an electric current which governs the servomotor, in a manner to be later set forth, a potentiometer resistance 42 is provided having a resistance coil 43 over which slides a contact arm 44. Arm 44 is pivotally mounted at 44a and is operatively connected to diaphragm 40 by a rod 45. The opposite extremities of resistance 43 are connected each to a terminal of a suitable source of electric energy 46. The arrangement provides a current at a high potential for high dynamic pressures and low potential for low pressures, said potential being measured across arm 44 and one of said terminals.

Novel means acting in cooperation with said potentiometer are provided for returning the control valve 30 to the closed position in accordance with the amount of the displacement of piston 36, comprising a bridge connection 47 which controls the current to a coil 48 upon armature 21c, the field of which acts in opposition to that of coil 22. The arms of bridge 47 are constituted, for example, by ohmic resistances 49, 50 and 51, 52. A contact arm 53, operatively connected to piston rod 37 of servomotor 31, is slidable over the bridge arms 49, 50. Piston 36 and rudder 38 are arranged in a centralized position when contact arm 53 is centered between resistance arms 49, 50. The contact arm 53 and a second contact 54, diagonally opposed thereto, are connected by leads 55, 56 to coil 48 upon armature 21c. The remaining two diagonally opposed points of bridge 47 are in connection by leads 57, 58 with one extremity of resistance 43 and with contact arm 44, respectively, whereby the potential to said bridge is governed. In order that bridge 47 may produce a smoothly changing current for armature coil 48, suitable means (not shown) may be provided for movably mounting contact 54 and operatively connecting the same to servomotor 31 or to compass 10.

It is highly desirable that the apparatus compensate for course deviations as smoothly and as quickly as possible and also that the time interval for compensating for a given course error be approximately equal for all air speeds. When the aircraft is traveling at low speed and a course deviation occurs, a greater compensating rudder deflection is required than when traveling at high speed. Consequently, the angular velocity of the rudder should be greater when the deflection is large than when small. Means are provided for controlling the rudder's angular velocity comprising, in the form shown, a variable resistance 59 which governs the strength of the field of rotary magnet 21 which, as above described, governs the servo-motor control valve 30. A contact arm 60 pivotally mounted at 60a and connected to the diaphragm 40 by rod 45 controls said variable resistance. The coils 61, 61 upon pole pieces 21b, 21b for example, are in series upon a lead 62 with resistance 59. Lead 62 is connected across the terminals of the energy source 46, the current of which is regulated by the above arrangement such that the strength of the field of said coils is low for high dynamic pressures and high for low pressures.

In operation, a deviation from a predetermined course will permit a current to flow to armature coil 22. Armature 21c will be displaced against the pressure of springs 29, 29 and will open control valve 30, thus permitting the pressure agent to act upon servomotor piston 36 to move rudder 38. As the servomotor piston rod 37 is longitudinally displaced, the contact arm 53 of bridge 47 will move therewith over resistance arm 49 or 50 and will permit a current to flow through said bridge in accordance with the displacement of the contact arm from the central position. This current flows to armature coil 48, the field of which opposes that of coil 22 and thus tends to counteract the motor action thereof. The dynamic air pressure acting upon diaphragm 40 controls the potential of the current to bridge 47 by means of the variable resistance 42. Consequently, the displacement of rudder 38 will be a function of the dynamic air pressure and hence a function of the proper turning moment necessary to restore the craft to the original course. The dynamic air pressure acting on diaphragm 40, by controlling resistance 59, controls the field strength of coils 61, 61 of the rotary magnet. The field strength of these coils is inversely proportional to said dynamic pressure. Consequently, the servomotor will operate and the control surface 38 will move with greater velocity when the craft is at a low air speed than when at a high speed, thus causing the time required to correct a given course error to be approximately equal for all air speeds.

For a given air speed, the dynamic air pressure will decrease with an increase in altitude due to the decrease in air density. Consequently, for the same air speed, a greater rudder deflection will be produced at a high altitude than at a low altitude.

Figure 2:
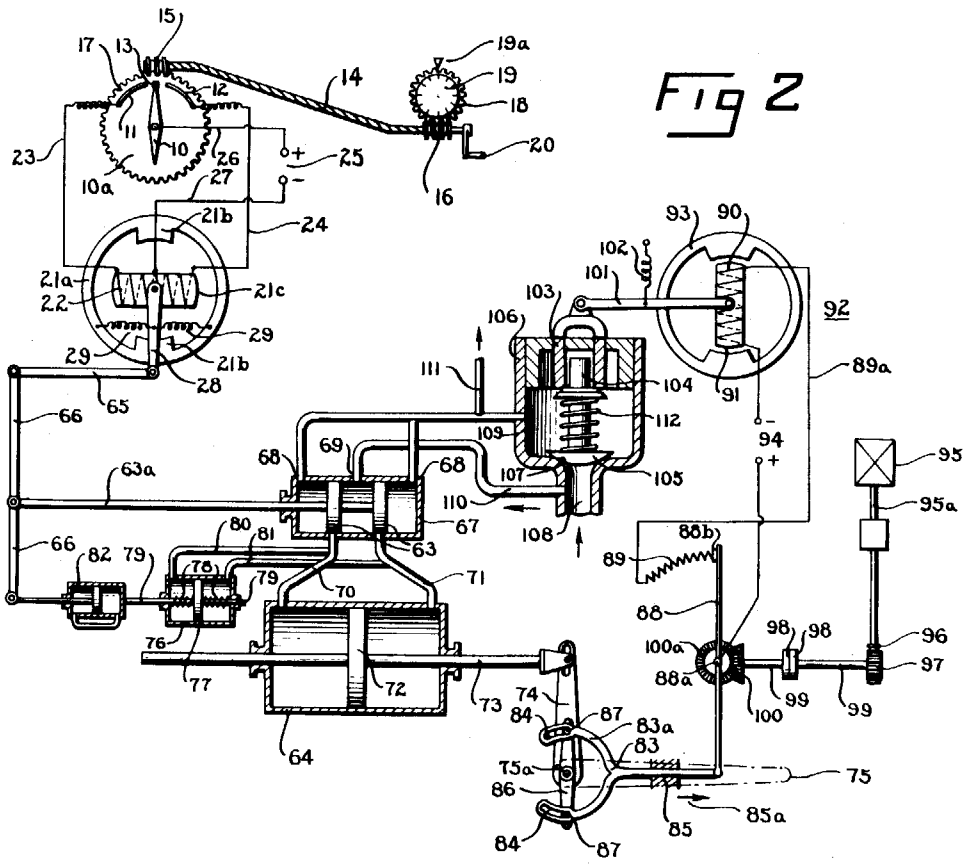
Fig. 2 is a schematic diagram of a second embodiment of the invention.

In the form illustrated in Fig. 2, a second embodiment of the apparatus is shown wherein novel means are provided for controlling the deflection of a control surface and the angular velocity at which the deflection takes place, comprising a direction indicator and an associated rotary magnet, both of which are identical to those shown in Fig. 1 with the exception that in the present embodiment the field of the rotary magnet is constant in strength and only the single coil 22, connected to the direction indicator, is wound upon the armature.

The rotary magnet is operatively connected to a control valve 63 for a hydraulic servomotor 64, by means of a rod 65 which connects arm 28 of said magnet to one extremity of a differential lever 66. The opposite extremity of lever 66 is positioned in a manner to appear later. Intermediate these extremities, a valve rod 63a for valve 63 is connected. Valve 63 moves within cylinder 67 having exhaust ports 68, 68 at either extremity thereof and a central inlet port 69. The cylinder is in communication with the motor 64 by means of conduits 70, 71 which enter said motor at opposite extremities thereof. A servomotor piston 72, having a rod 73, is operatively connected to a crank arm 74 which, in the form shown, is rigidly attached to a control surface or rudder 75 pivotally mounted at 75a.

Means are provided in combination with the above described apparatus whereby the control surface displacement, in compensation for a course error, is determined not only by said error, as transmitted by the compass 10, but also by the actual turning moment or force required to regain the original course. The means comprise a pressure gauge 76 which is operatively connected to servomotor 64 in such a manner that the gauge serves as a motor for governing the closing of valve 63 in accordance with the pressure of the agent within motor 64, said pressure being a function of the above-mentioned turning moment. Gauge 76 is provided with a piston 77 normally held in a central position by opposed coil springs 78, 78 which, for example, surround a piston rod 79 upon which the piston is mounted. Conduits 80, 81, connected to the gauge, are also connected to conduits 70, 71, respectively, and communicate the pressure differential in the latter two conduits to said gauge. A conventional hydraulic or pneumatic dashpot 82 is attached to piston rod 79 of gauge 76, and cushions the piston movements which position the extremity of lever 66, said extremity being opposite to that controlled by rotary magnet 21.

In connection with the first embodiment, the angular velocity of the rudder deflection is a function of the dynamic air pressure as measured by a gauge, i. e., the angular velocity is indirectly dependent upon the amount of the rudder deflection; however, in the present embodiment, the rudder velocity is directly dependent upon the amount of rudder deflection. Novel means are provided for so governing this velocity comprising a unidirectional coupling constituted by a bifurcated member 83 having fingers 83a, 83a each of which are provided with slotted arcuate end portions 84, 84. Member 83 is adapted for longitudinal displacement, being mounted in a bearing 85 and operatively connected to rudder 75 by means of a cross-lever 86 centrally mounted at 75a and rigidly attached to said rudder. Pins 87, 87 at either extremity of lever 86 extend into the slots of the end portions 84, 84. The arcuate slots are so formed that when arm 74 is moved equal amounts in either a clockwise or counterclockwise direction from the central position, as shown in Fig. 2, the member 83 is displaced longitudinally the same amount in the direction of the arrow 85a.

The movements of member 83 are amplified, for example, by a rotary magnet arrangement which is controlled by a variable resistance. The free extremity of member 83 is linked to an arm 88 which is pivotally mounted at 88a. Arm 88, having an electric contact 88b at its free extremity, slidably engages a variable resistance 89 which is connected by a lead 89a to an armature coil 90 upon an armature 91 of a rotary magnet 92 having a stator 93. Coil 90 is also connected to the arm 88 at 88a and hence to contact 88b through a suitable source of electric energy 94. In order that contact 88b may be normally held at a zero position upon resistance 89, a motor 95 having a shaft 95a is connected, through a worm and wheel 96, 97 to a conventional friction coupling 98, 98 upon a shaft 99. Shaft 99 is connected to arm 88 by bevel gears 100, 100a, respectively, whereby the arrangement urges said arm in a clockwise direction towards the zero position shown in Fig. 2.

Armature 91 is operatively connected to a pressure regulating valve which governs the pressure of the medium energizing the servo-motor 64. The connection comprises an arm 101 attached to said armature and yieldingly urged in a clockwise direction by a spring 102. Arm 101 is pivotally connected to a bifurcated portion 103 which positions a valve rod 104 of a pressure regulating valve 105 having a housing 106 which, in turn, is provided with a valve seat 107. Valve seat 107 constitutes the mouth of an inlet conduit 108 which is connected to said valve housing. An exhaust port for said housing is provided at 109.

The pressure regulating arrangement is operatively connected to servo-motor 64 by means of conduit 110 which connects conduit 108 to the control valve cylinder at inlet 69 therein. The exhaust ports 68, 69 in said cylinder and port 109 in housing 106 are in communication with a common exhaust conduit 111.

Between the fingers of the bifurcated member 103 is a metal portion having a suitable bore through which the valve rod extends. Surrounding the valve rod and interposed between the valve 105 and said metal portion is a coil spring 112 which resiliently urges said valve towards seat 107. Adjusting means (not shown) are provided for governing the normal tension of spring 112 whereby the pressure of the working agent and the sensitiveness of the pressure regulator is controlled.

In operation, a deviation from a predetermined course will cause armature 21c to move in accordance with the direction of the deviation. The differential lever 66 will thus be moved and valve 63 will be opened permitting the pressure agent to flow to servo-motor 64. Rudder 75 will be angularly displaced until the pressure differential on opposite sides of piston 72 has reached a point indicative of a proper turning moment, at which time the piston 77 will have moved against the pressure of springs 78, 78 to close the valve 63 by means of the differential lever 66. The movements of piston 77 are smoothly cushioned by dashpot 82.

When rudder 75 is in the centralized position, the bifurcated member 83 is in the zero position (Fig. 2) and exerts no turning moment upon arm 88. Motor 95, by means of friction coupling 98, 98, is effective to yieldingly urge arm 88 in a clockwise direction whereby the arm is held in the zero position upon resistance 89. In this position, the coil 90 of rotary magnet 92 is not energized and spring 102 acting through armature arm 101 is effective to hold bifurcated member 103 in its uppermost position. Spring 112 is at an adjusted tension which will permit a desired leakage of the pressure agent past valve 105. The agent flowing to the servo-motor in conduit 110 from conduit 108 is consequently reduced in pressure, and the speed with which the servo-motor operates will be proportional to this reduced pressure. A deflection of rudder 75 from the central position will longitudinally move member 83 in accordance therewith. Arm 88, against the action of coupling 98, 98, will be displaced from the zero position upon resistance 89, coil 90 will be energized and armature 90 will move in a counter-clockwise direction against the pressure of spring 102. The member 103 will thus be urged downwardly, spring 112 will be compressed, and the quantity of the pressure agent leaking past valve 105 will be reduced. As the leakage past the valve is reduced, the pressure acting upon motor piston 72 and the speed of the motor will increase. Consequently, the angular velocity of the rudder 75 will progressively increase as the rudder deflection increases up to the point where the servo-motor valve 63 undergoes the closing action produced by pressure gauge 76, as above mentioned. During the closing of valve 63, rudder 75 smoothly and uniformly decelerates in angular velocity until it comes to rest.

Figure 3:
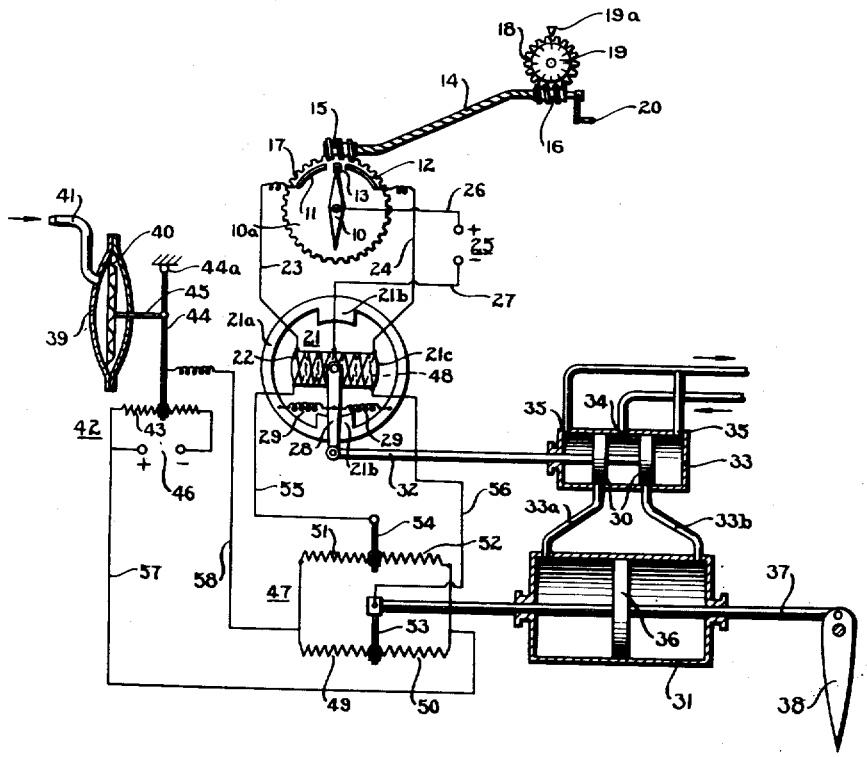
Fig. 3 is a schematic diagram of a third embodiment of the invention.

In the form shown in Figure 3, a third embodiment of the invention is illustrated constituting a combination of the elements of the embodiment of Fig. 1 with the exception that no means are provided for controlling the strength of the field coils upon pole pieces 21*b*, 21*b*.

The operation of this embodiment is similar to that of the first embodiment with the exception that the angular velocity at which armature 21 moves is a function only of the strength of the field of armature coil 48 coacting with the constant fields of coil 22 and of the coils (not shown) upon pole pieces 21*b*, 21*b*.

There is thus provided a novel course control device wherein the corrections for course deviations are functions of the proper turning moment to restore the craft to the original course. The apparatus is effective to govern the speed at which deflections of the control surface occur such that large deflections take place rapidly relative to small deflections, whereby equal course deviations are corrected in approximately equal periods of time for all air speeds.

Although only three embodiments of the invention have been illustrated and described in detail, it is to be expressly understood that the invention is not limited thereto. For example, electric or pneumatic servo-motors may be employed instead of the hydraulic type here used. The apparatus instead of controlling a rudder of an aircraft whereby the course is governed may be adapted for controlling other control surfaces, for example, surfaces governing the altitude of the craft. Furthermore, in the first embodiment, a dynamic air pressure gauge is employed; however, this may be replaced by suitable means for measuring dynamic water pressure if the apparatus is to be associated with marine vessels. The pressure regulating device for controlling the servo-motor speed in the embodiment of Fig. 2 may be operatively connected to the variable resistance 59 of Fig. 1. Also, the dynamic air pressure gauge of Fig. 1 may be employed to control the pressure regulating valve of Fig. 2. It is also possible to substitute the pressure gauge 76 of Fig. 2 for the dynamic air pressure gauge of Fig. 1, wherein the former controls the potential to bridge 47 of Fig. 1. Various changes may also be made in the design and arrangement of parts illustrated without departing from the spirit and scope of the invention, as will now be understood by those skilled in the art. For a definition of the limits of the invention, reference will be had primarily to the appended claims.

What is claimed is:

1. The combination with an attitude indicator for a vehicle, of a servo-motor, a control valve therefor, a control surface operatively connected to said servo-motor, means for governing said control valve in response to deviations from a predetermined indication of said attitude indicator, means acting in opposition to the first-named means in response to the vehicle speed, and means for controlling the velocity of said servo-motor in response to said vehicle speed.

2. The combination with an attitude indicator for aircraft, of a servo-motor, a control surface operatively connected thereto, means for actuating said servo-motor in response to deviations from a predetermined indication of said attitude indicator, means for arresting the movement of said servo-motor in response to the air speed, and means for governing the velocity of said servo-motor also in response to the air speed.

3. The combination with an attitude indicator for aircraft, of a servo-motor, a control valve therefor, a control surface operatively connected to said servo-motor, means for opening said valve in response to deviations from a predetermined attitude, means for closing said valve in response to the deflection of said control surface and to the air speed, and means for controlling the speed of opening and closing said valve in response to said air speed.

4. The combination with an attitude indicator for aircraft, of a servo-motor, a control valve therefor, means for opening said valve in response to a deviation from a predetermined attitude, a control surface operatively connected to said motor, means for closing said valve in response to the pressure of an agent actuating said motor, and means for controlling said pressure in response to the displacement of said control surface.

5. In apparatus of the class described, an attitude indicator, a servo-motor, a control valve therefor, a control surface for a vehicle operatively connected to said motor, means for governing said valve in response to changes from a predetermined indication of said attitude indicator, means for controlling the speed of operation of said motor in response to the dynamic pressure of the fluid sustaining said vehicle, and means for continuously opposing the action of the first-named governing means in accordance with said dynamic pressure and also in accordance with the deflection of said control surface.

6. The combination in a vehicle of a control surface therefor, power means for actuating said control surfaces, and means controlling the speed of operation of said power means including means responsive to the velocity of said vehicle relative to the medium sustaining the same.

7. The combination in a vehicle of a control surface therefor, power means for actuating said control surface, attitude responsive means for actuating said power means in response to a deviation from a predetermined attitude, and means for governing said power means whereby the amount and the speed of the displacement of said control surface is responsive to the velocity of said vehicle.

8. In apparatus of the class described, a control surface for a vehicle, power means for actuating said control surface, speed control means for said power means including means responsive to the velocity of said vehicle relative to the medium sustaining the same, and a uni-directional coupling member operatively connecting said speed control means and said control surface.

9. In apparatus of the class described, a control surface for a vehicle, power means for actuating said control surface, speed control means for said power means including means responsive to the deflection of said control surface, a control member for said speed control means, and means for yieldingly urging said control member to a predetermined position.

10. In apparatus of the class described, a control surface for an aircraft, power means for actuating said control surface, deflection control means for said control surface including means for governing said power means in accordance with the air speed, means for governing the speed of said power means in accordance with the deflection of said control surface, and means for operatively connecting said power means and speed control means including a coupling whereby angular movements of said control surface in both clockwise and counter-clockwise direction, from a predetermined position, are translated into linear movements in one direction.

11. The combination with a vehicle, of attitude responsive means, a control surface for said vehicle, power means for governing said control surface, means for actuating said power means in accordance with said attitude responsive means, means for arresting said power means in response to the dynamic air pressure and to the deflection of said control surface, and means acting simultaneously with said last-named means for controlling the speed of said power means.

12. The combination with attitude responsive means for a vehicle of power means, a control member for said power means, means for moving said control member in accordance with said attitude responsive means, means for moving said member in a direction opposite to the first movement in response to the pressure of an agent energizing said power means, and pressure regulating means for said agent, the latter means being governed by the action of said power means.

13. In apparatus of the class described, a control surface for a vehicle, power means for actuating said control surface, speed control means for said power means including means responsive to the deflection of said control surface, means for controlling the amount of movement of said power means including means responsive to the counteracting pressure upon said control surface, a control member for said speed control means, and means including a friction coupling for yieldingly urging said control member to a predetermined position.

14. The combination with a vehicle of a servo-motor, a vehicle control surface operatively connected thereto, attitude responsive means operatively connected to said servo-motor, and dynamic fluid pressure responsive means for continuously opposing the action of said attitude responsive means upon said power means.

15. In apparatus of the class described, a control surface, power means for actuating said control surface, means responsive to a dynamic fluid pressure, attitude responsive means for actuating said power means, and means for continuously counteracting the effect of said attitude responsive means in accordance with said dynamic fluid pressure and in accordance with the deflection of said control surface.

16. In apparatus of the class described, a control surface for a vehicle, power means for actuating said control surface, a control member for said power means, attitude responsive means for moving said control member from a predetermined position, and dynamic fluid pressure responsive means for returning said member to the predetermined position.

17. The combination with a control surface for a vehicle of power means for actuating said control surface, control means for said power means, an electric bridge operatively connected to said power means whereby the resistances in said bridge are varied, said bridge also being operatively connected to said control means, and dynamic pressure responsive means for controlling the potential across said bridge.

18. The combination with power means, of control means therefor, means for displacing said control means from a predetermined position, and dynamic pressure responsive means in association with said power means for returning said control means to the predetermined position.

19. The combination with an attitude indicator for aircraft, of a servo-motor, a control valve therefor, means for opening said valve in response to a deviation from a predetermined attitude, a control surface operatively connected to said servo-motor, means for closing said valve in response to the pressure of an agent actuating said motor, means for controlling said pressure in response to the displacement of said control surface, and means for adjusting the sensitiveness of said last-named means.

20. The combination with a control surface for a vehicle of power means for actuating said control surface, control means for said power means, and an electric bridge operatively connected to said power means whereby the resistances in said bridge are varied, and means operatively connecting said bridge to said control means.

21. The combination with a control surface for a vehicle of power means for actuating said control surface, control means for said power means, and means controlled by the differential variation in the power supplied by said power means for controlling said power means.

22. The combination in a vehicle of a control surface therefor, power means for actuating said control surface, and means controlling the speed of operation of said power means comprising means responsive to the velocity of said vehicle relative to the medium sustaining the same, and means responsive to the deflection of said control surface from a predetermined position.

23. In an automatic pilot for aircraft and the like, the combination of a servo-motor, means responsive to deviation of the craft about an axis thereof for controlling said servo-motor in accordance with said deviation, a control surface connected to said servo-motor for actuation by the latter to control said craft about said axis, and means controlling the speed of operation of said servo-motor comprising means responsive to the velocity of said craft relative to the medium sustaining the same, and means responsive to the deflection of said control surface from a predetermined position.

EDUARD FISCHEL.
JOHANNES THIRY.